(12) United States Patent
Mayblum et al.

(10) Patent No.: US 7,668,515 B2
(45) Date of Patent: Feb. 23, 2010

(54) PORTABLE TELEPHONE FOR CONVEYING REAL TIME WALKIE-TALKIE STREAMING AUDIO-VIDEO

(75) Inventors: Amir Mayblum, Concord, CA (US); Daphna Steinmetz, Ramat Gan (IL)

(73) Assignee: Comverse Ltd., Tel Aviv (IL)

( * ) Notice: Subject to any disclaimer, the term of this patent is extended or adjusted under 35 U.S.C. 154(b) by 537 days.

(21) Appl. No.: 10/958,339

(22) Filed: Oct. 6, 2004

(65) Prior Publication Data
US 2006/0073795 A1 Apr. 6, 2006

(51) Int. Cl.
*H04B 1/38* (2006.01)
(52) U.S. Cl. .............. 455/90.2; 455/90.3; 455/518; 455/519
(58) Field of Classification Search .............. 455/90.2, 455/90.3, 518, 519, 550.1, 575.1
See application file for complete search history.

(56) References Cited

U.S. PATENT DOCUMENTS

| | | | |
|---|---|---|---|
| 6,763,226 B1* | 7/2004 | McZeal, Jr. .............. | 455/90.2 |
| 7,428,422 B2* | 9/2008 | Hannu et al. .............. | 455/518 |
| 2004/0148353 A1* | 7/2004 | Karaoguz et al. .............. | 709/205 |
| 2004/0179039 A1* | 9/2004 | Blattner et al. .............. | 345/758 |
| 2005/0172001 A1* | 8/2005 | Zaner et al. .............. | 709/205 |
| 2005/0250449 A1* | 11/2005 | Janik et al. .............. | 455/41.3 |

FOREIGN PATENT DOCUMENTS

| | | |
|---|---|---|
| EP | 1 450 570 A1 | 8/2004 |
| WO | WO 03/058518 A2 | 7/2003 |

OTHER PUBLICATIONS

Open Mobile Alliance, OMA-REQ-2003-0801, PoC-Joining-a-PoC-session, Manfred Leitgeb: "PoC—Joining and re-joining a PoC Group", submitted to OMA REQ on Nov. 26, 2003. In English.
Open Mobile Alliance, OMA-REQ—2003-0820-PoC Charging Definitions, Kennie Kwong: "PoC Charging Definitions", submitted to OMA Requirements Working Group on Dec. 2, 2003. In English.
Open Mobile Alliance, OMA-REQ-2003-0829-PoC-RD-for-formal-review, Manfred Leitgeb: "PoC-RD-for-formal-review", submitted to OMA REQ on Nov. 26, 2003. In English.
Open Mobile Alliance, OMA-RD_PoC-V1_0-20031204-D, "Push to Talk over Cellular Requirements", Draft Version 1.0—Dec. 4, 2003. In English.
Open Mobile Alliance, OMA-REQ-2003-0799-Requirements Prioritisation, Ileana Leuca: Results of PoC RD Requirements Prioritisation, submitted to OMA REQ WG on Nov. 24, 2003. In English.

* cited by examiner

*Primary Examiner*—Nay A Maung
*Assistant Examiner*—Tuan H Nguyen
(74) *Attorney, Agent, or Firm*—Ohlandt, Greeley, Ruggiero & Perle, L.L.P.

(57) ABSTRACT

A communications device having a display and an integral camera and being provided with a walkie-talkie mode for conveying real time streaming audio-video to one or more receiving devices.

15 Claims, 5 Drawing Sheets

PORTABLE TELEPHONE FOR CONVEYING REAL TIME WALKIE-TALKIE STREAMING AUDIO-VIDEO

BACKGROUND OF THE INVENTION

1. Field of the Invention

The present invention relates to a telephony communication and, more particularly, to a push to talk over a cellular (PoC) telephony.

2. Description of the Related Art

The Push-to-Talk over Cellular (PoC) Standard of the Open Mobile Alliance™ supports a push-to-talk communication between participating cellular telephones that support the PoC standard. As is well-known, the Push-to-Talk standard allows a walkie-talkie type half-duplex communication to be carried out between registered users.

Typically, a transmitting telephone device has an address book containing telephone numbers of contacts with whom a session may be established. An initiator selects a recipient from the address book and a push-button is depressed, whereupon a half-duplex communication session is established with the selected recipient. The recipient is alerted, typically by a characteristic tone that informs him that the incoming call is a Push-to-Talk call. The recipient may depress an accept-call button, whereby (s)he will be able to hear the initiator, but without the ability to reply until the initiator ceases speaking and lifts his finger from the push-button.

If the recipient is equipped with a PoC-compatible device, (s)he may at this stage depress a similar push-button on her/his device so as to establish a walkie-talkie type communication with the initiator. If the recipient is not equipped with a PoC-compatible device, then no service can be provided and in such a case a tone indicating failure will be heard on the initiator device.

Mobile telephones having integral cameras are becoming popular. These telephones allow still video images to be captured and communicated to remote users, both over the cellular network and, of course, over the Internet.

For example, U.S. Pat. No. 6,763,226 to McZeal Jr. filed Jul. 31, 2002 relates to a multifunctional world wide walkie-talkie, a cellular-satellite wireless instant messenger computer and a network for establishing global wireless VoIP communications, unified messaging, and video conferencing via the Internet. Upon depressing a send video mail button, a built-in real time digital web camera is activated. This digital web camera provides a pre-recorded live video for a subsequent data transfer to another unit, Internet user, cell phone, email address or any other computing device capable of receiving MPEG, wav, or sound files.

U.S. Pat. No. 6,763,226, however, does not allow real time walkie-talkie video streaming between the participating devices. Moreover, in U.S. Pat. No. 6,763,226, the world wide walkie-talkie operates principally using VoIP over the Internet and is not compatible with the prevailing PoC Standard. Accordingly, the world wide walkie-talkie described in U.S. Pat. No. 6,763,226 cannot establish real time walkie talkie video streaming with a cellular telephone operating under the PoC Standard and requires not only special software but also special hardware to operate under the PoC. Specifically, an enhanced cellular telephone having a video display device and capable of receiving walkie-talkie audio communication under the PoC Standard, would not be able to receive video streaming from a sending party operating according to the protocols described in U.S. Pat. No. 6,763,226.

It would therefore be desirable and significantly beneficial if an enhanced cellular telephone having a video display device could initiate a real time video streaming under the PoC Standard to a sending party. It would also be desirable if such an enhanced cellular telephone could perform this operation without further modification.

It would also be desirable if an enhanced cellular telephone having a video display device could receive a real time video streaming from a sending party without further modification and regardless of its own ability to initiate such a communication.

Furthermore, WO03058518 to Crampton published Jul. 17, 2003 and titled "Method and apparatus for an avatar user interface system," discloses an avatar user interface system where a server operates a communication session between one or more computing appliance means coupled via a network. An avatar user interface application resides on each computing appliance for representing the user visually by an avatar.

Moreover, EP1450570A1 published Aug. 25, 2004 to Lucent Technologies Inc. and titled "Communication to one mobile station of update of call participation availability status of another mobile station," discloses an application server component of an apparatus that comprises a buddy list service that monitors a status (e.g., online, offline, busy, on a call) of mobile stations to determine whether these mobile stations are available for participation in a call. A buddy list, in one example, has a user administered list of colleagues, workgroup members, and/or friends.

All of the above mentioned references are incorporated herein by reference.

SUMMARY OF THE INVENTION

In view of the shortcomings of the prior systems, it is an object of the present invention to provide an enhanced cellular telephone having a video display device that is adapted to initiate real time walkie-talkie video streaming under the PoC Standard to a sending party. It is another object to provide this operation without modification of the existing cellular phone.

It is a further object of the present invention to allow any enhanced cellular telephone having a video display device to receive real time walkie-talkie video streaming from a sending party without further modification and regardless of the sending party's ability to initiate such a communication.

It is yet a further object of the present invention to provide an enhanced PoC server that supports real time walkie-talkie streaming video.

These and other objects are realized in accordance with a first aspect of the present invention by a communications device. This communication device has a display and an integral camera and is provided with a walkie-talkie mode for conveying real time streaming audio-video to one or more receiving devices.

The first aspect of the present invention may overcome the above described disadvantages and other disadvantages not described above. The present invention is not necessarily required to overcome any of the disadvantages described above, and the first aspect of the present invention may not overcome any of the problems described above. The appended claims should be consulted to ascertain the true scope of the invention.

BRIEF DESCRIPTION OF THE DRAWINGS

In order to understand the invention and to see how it may be carried out in practice, illustrative embodiments will now be described, by way of non-limiting examples only, with reference to the accompanying drawings, in which.

DETAILED DESCRIPTION OF EXEMPLARY EMBODIMENTS

Figure 1:
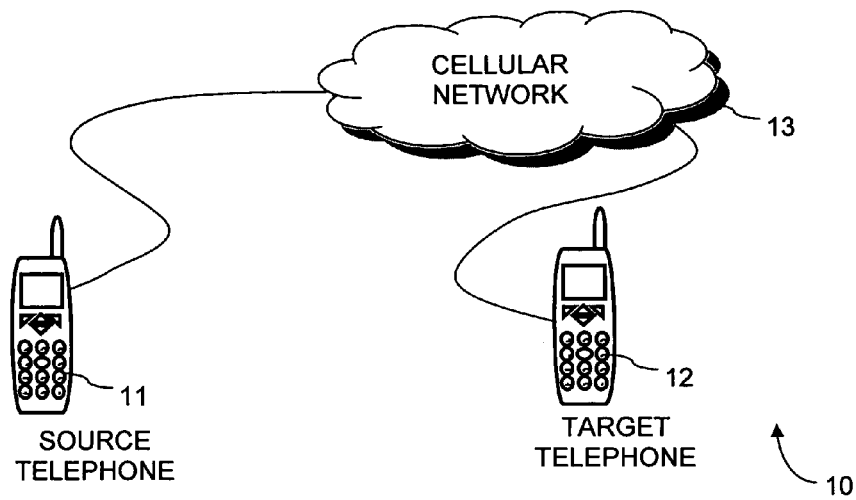
FIGS. 1 and 2 pictorially show representations of communication systems for allowing a source telephone to convey real time streaming audio-video to one or more receiving devices according to an illustrative, non-limiting embodiment.

The present invention will now be described in detail by describing illustrative, non-limiting embodiments thereof with reference to the accompanying drawings. In the drawings, the same reference characters denote the same elements.

The PoC Standard of the Open Mobile Alliance™ is public and is described in their draft Standard OMA-RD_PoC-V1_0-20031204-D available from their website and is incorporated herein by reference. Many of the features supported by this standard are amenable to implementation by one skilled in the art based on the information in this standard.

FIG. 1 pictorially shows a system 10 for conveying real time video streaming between a source telephone 11 and a target telephone 12 interconnected via the Cellular Telephone Network 13 according to an illustrative embodiment.

Figure 2:
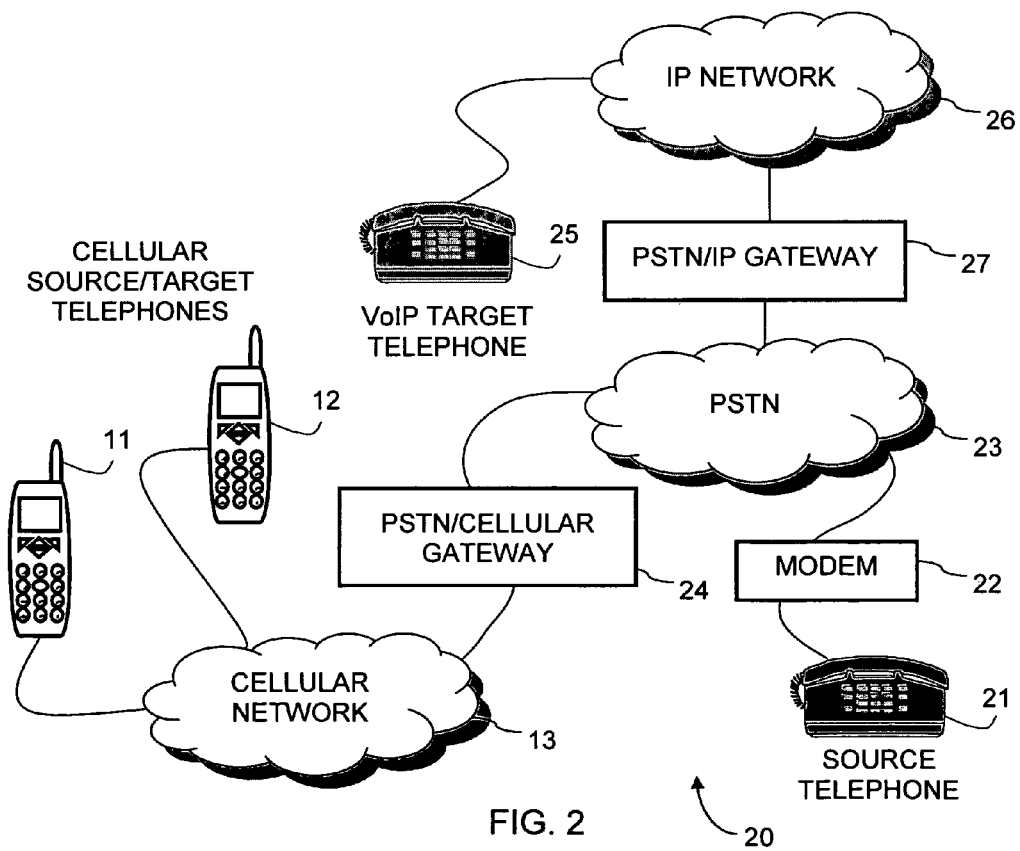

FIG. 2 is a pictorial representation of a hybrid system 20 for conveying real time video streaming between source and target cellular telephones 11 and 12 connected to the cellular network 13. Additionally, a smart PSTN telephone 21 connected to the PSTN 23 via a modem 22 may also serve as a source telephone. When the PSTN telephone 21 serves as a source telephone, the PSTN 23 serves as a conduit to the cellular network 13 via a PSTN/Cellular gateway 24.

A VoIP target telephone 25 may serve as either a source or a target and is coupled to an IP network 26 that is connected to the PSTN 23 via a PSTN/IP gateway 27. A substantive difference between the system 10 shown in FIG. 1 and the hybrid system 20 shown in FIG. 2 is that in the system 20 signaling and media are conveyed from one network to another via the PSTN/Cellular gateway 24 and/or the PSTN/IP gateway 27, which operate in a manner well known in the art to convert the signals between PSTN and IP or PSTN and Cellular protocols and vice versa. As is known, the cellular network 13 is already essentially "PoC enabled". The PSTN/IP gateway 27 and the PSTN/Cellular gateway 24 should either emulate the PoC protocol in respect of the source telephones in the respective networks or at the very least serve as conduits to pass audio and streaming to the cellular network 13 and/or the IP network 26.

By way of an example, so far as the IP network 26 is concerned, the PSTN/IP gateway 27 functions as an intermediate target that receives signaling and media from the source telephone 21. In the IP network 26, the signaling and media are received together. The PSTN/IP gateway 27 places the signaling and media in the same path and the IP network 26 allow connection to the VoIP target telephone 25. An audio or video stream conveyed by the source telephone 21 is directed by the PSTN 23 to the PSTN/IP gateway 27, which in turn determines that the required destination is either the cellular target telephone 12 in the cellular network 13 or the VoIP target telephone 25 in the IP network 26.

When the target is the cellular telephone 12, the message reaches the PSTN/Cellular gateway 24, which determines that the destination address is a telephone in the cellular network 13. When the target is the VoIP target telephone 25, the PSTN/IP gateway 27 receives the signaling and media from the PSTN 23, where the signaling and the media traveled on separate paths in the PSTN 23. Then, the PSTN/IP gateway 27 performs the required protocol conversion, and re-directs the signaling and media on a common path in the IP network 26 to the target telephone 25. The PSTN/IP gateway 27 converts IP network instant messages to the necessary format for the PSTN 23.

Thus, the exemplary embodiment allows video and audio streaming in real time within the cellular network or between the cellular network and the IP network or the PSTN, as well as allowing limited streaming functionality between the PSTN and the other two networks. In order to allow for real time streaming between the source and target telephones, the communication networks must have sufficient bandwidth and the source and target telephones must have sufficient communication stack (streaming) to receive the data from the network and a sufficient CPU to decode and display the received video and audio when received.

Figure 3:
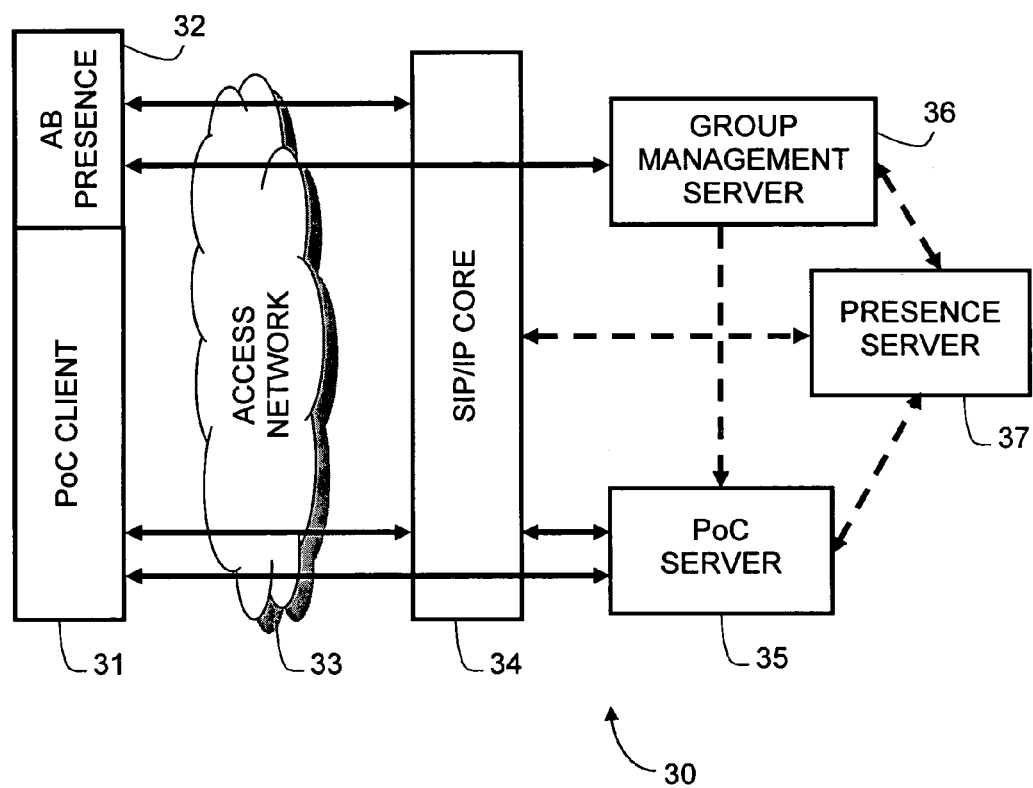
FIG. 3 schematically shows a client-server system suitable for implementing another exemplary, non-limiting embodiment.

FIG. 3 schematically shows a client-server system 30 suitable for carrying out an exemplary, non-limiting embodiment. The system 30 includes a PoC client 31 having an optional AB presence unit 32. The PoC client 31 is coupled via an access network 33 to a SIP/IP core 34 and thence to a PoC server 35, thus allowing bi-directional communication between the PoC client 31 and the PoC server 35. The AB presence unit 32 is likewise coupled to the SIP/IP core 34 and thence to a Group Management Server 36. Optionally, a presence server 37 coupled to the SIP/IP core 34 and to the PoC server 35 and the Group Management Server 36 may also be provided. The system 30 may be implemented in any IP network, e.g., cellular, Wireless LAN, wireline IP based connection, Modem connection (over any bearer—PSTN, PLMN, etc.).

The AB presence unit 32 is a client that connects to the presence server 37 to provide presence and service identification data. The PoC client 31 does not obtain this data directly from the presence server but rather takes data provided by the presence client (the AB presence unit 32) and uses this data to update the presence data and the service information received from the network. If the presence information (information about the properties of potential target devices) is not required, then both the AB presence unit 32 and the presence server 37 may be dispensed with. Otherwise, both the AB presence unit 32 and the presence server 37 are needed.

The system 30 depicts a standard arrangement for a PoC telephony as described in the above-referenced PoC Standard of the Open Mobile Alliance™ and will therefore not be described in detail. It is, however, noted that the above-referenced PoC Standard does not accommodate video-streaming of any kind. In order for video streaming to be enabled using the PoC Standard, it is necessary to make enhancements to the telephone devices and to the PoC Server and the remaining description will therefore relate to these exemplary enhancements.

Before describing the exemplary telephone devices in detail, it is first noted that in the exemplary, non-limiting embodiments, at least two types of source telephone are contemplated. An enhanced device is capable of sending both audio and video, while a simplified device is not capable of sending video but is able to send audio in a similar manner, for example, to current PoC enabled cellular telephones. This distinction allows current PoC enabled cellular telephones, for example, having no video capture or streaming facility nevertheless to participate in walkie-talkie type communication with enhanced telephones that can send and receive both audio and video. Clearly, such a simplified device can also receive audio streaming data in a PoC mode when communicating with an enhanced telephone as it should be appreciated that the terms "source" and "target" are relative and during the course of normal communication these roles are interchangeable. However, it will be appreciated that PoC enabled telephones do not need to be cellular telephones and the invention contemplates the use of any PoC enabled telephone is contemplated: the only requirement being that they are IP enabled.

Figure 4:
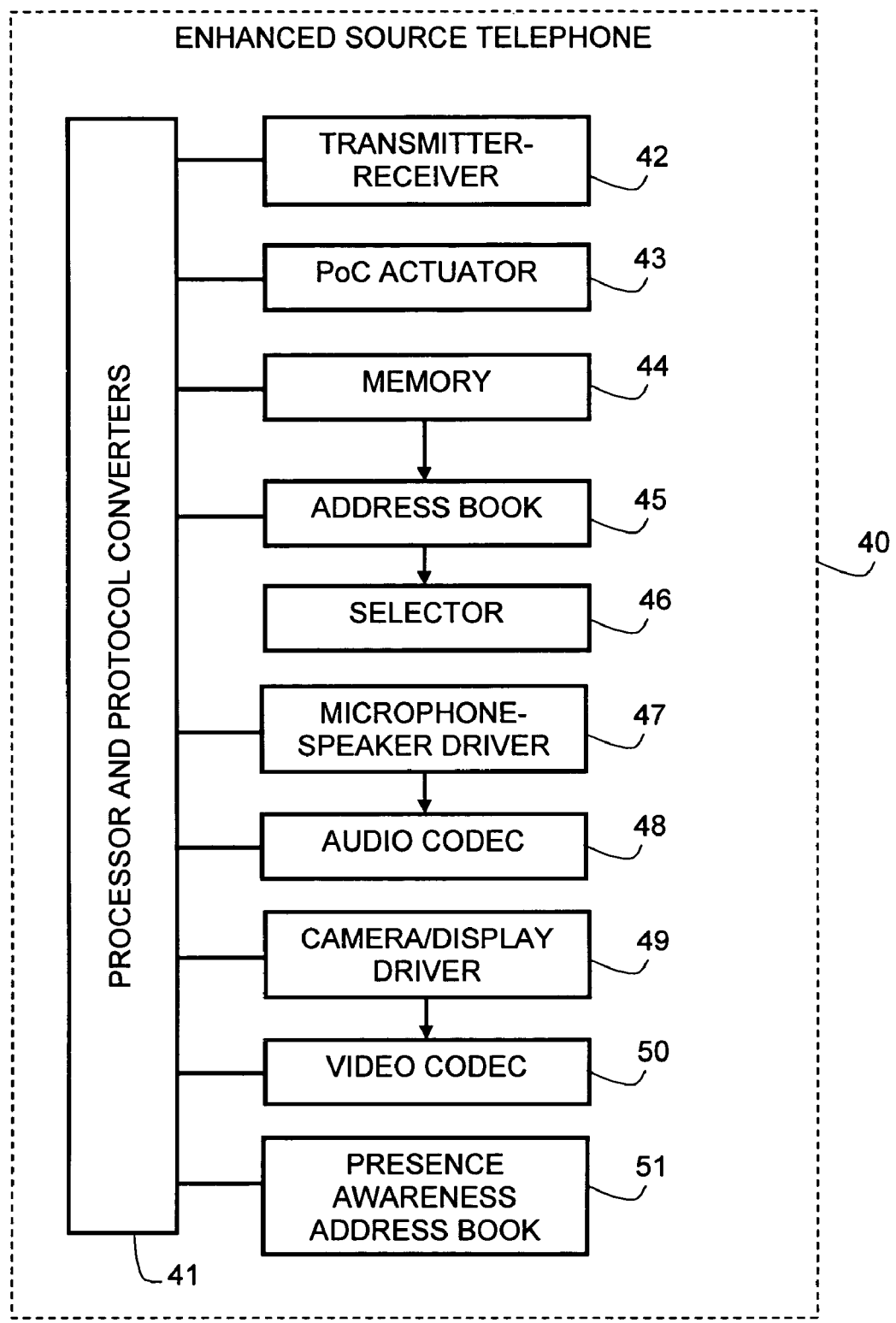
FIG. 4 is a block diagram showing the functionality of an enhanced source telephone adapted to convey real time streaming audio-video to one or more receiving device in accordance with another exemplary, non-limiting embodiment.

FIG. 4 is a block diagram showing the functionality of an exemplary enhanced source telephone 40 according to the exemplary, non-limiting embodiment. In this depicted example, the enhanced source telephone 40 is a cellular telephone. The source telephone 40 has a processor and protocol converters shown generally as 41. A transmitter/receiver 42 allows cellular transmissions and receptions in a known manner. A PoC actuator 43 (constituting a walkie-talkie actuator) permits PoC mode to be invoked whereby a half-duplex "walkie-talkie" type transmission is conveyed to a receiving device. A memory 44 stores data such as an address book 45 and a selector 46 that allows respective telephone numbers of one or more addresses to be selected for conveying PoC video streaming thereto.

In FIG. 4, the enhanced source telephone also has a microphone/speaker driver 47 that allows speech to be converted to electrical signals which are then encoded by an audio codec 48 for producing an audio stream in a known manner. Likewise, a camera/display driver 49 allows a video image to be captured and is coupled to a video codec 50 that converts it to a video stream in a known manner. Also shown in FIG. 4 is a presence awareness address book 51, which is functionally similar to a buddy list, such as the one described in EP 1450570A1, allowing, for example, the status of members thereof to be displayed using suitable icons. This presence awareness address book 51 allows the user to determine at a glance whether a receiving device is on-line and available for receiving audio-video streaming data. The status may also indicate whether a receiving device associated with a selected member is an enhanced or is a simple device. This information may be used to avoid video capture and video streaming to a receiving device that is flagged as being incapable of video streaming.

Figure 5:
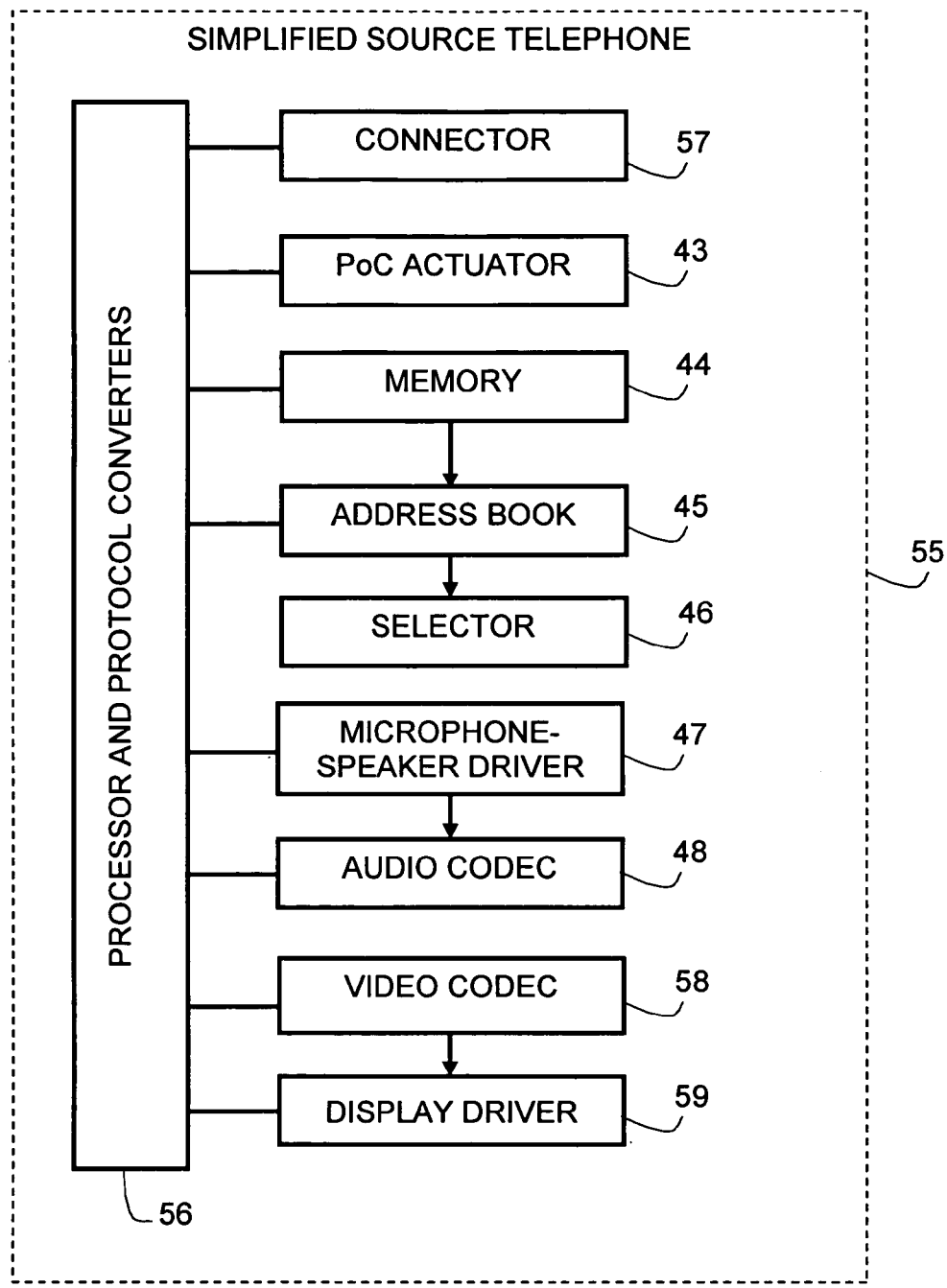
FIG. 5 is a block diagram showing the functionality of a simplified source telephone adapted to convey real time streaming audio without the video to one or more receiving devices in accordance with yet another exemplary, non-limiting embodiment.

FIG. 5 is a block diagram showing the functionality of an exemplary simplified source telephone 55 adapted to convey real time streaming audio without video. To the extent that the simplified source telephone 55 shares many of the same features described above with regard to the enhanced source telephone 40 shown in FIG. 4, identical reference numerals will be employed. Thus, the simplified source telephone 55 comprises a processor and protocol converters shown generally as 56. These will not be (or need not need) identical to those employed in the enhanced telephone since there is no facility for video capture. On the other hand, it is to be noted (as will be explained below) that the simplified telephone 55 may be provided with a display and may therefore be capable of displaying video data, even though it cannot compile and transmit video streaming data. A connector 57 allows the simplified source telephone 55 to be connected to a telephone network. To this end, the connector 57 may be a PSTN jack for coupling the telephone to the PSTN via a modem as shown in FIG. 2. Alternatively, it may be a data jack of a VoIP telephone connected to the IP network also shown in FIG. 2. However, it should be noted that both FIGS. 4 and 5 are schematic and are intended to show only some of the possible variations. Thus, other combinations of features are also possible and are within the scope of the invention. For example, the simplified telephone may also be a cellular telephone equipped with a transmitter/receiver that allows cellular transmissions and receptions in a known manner. When the simplified source telephone 55 is a cellular telephone, the connector 57 need not be provided.

In addition, the simplified source telephone 55 has a PoC actuator 43 as depicted in FIG. 5. A PoC actuator 43 (constituting a walkie-talkie actuator) permits a PoC mode to be invoked whereby a half-duplex "walkie-talkie" type transmission is conveyed to a receiving device. A memory 44 stores data such as an address book 45 and a selector 46 that allows respective telephone numbers of one or more addresses to be selected for conveying PoC video streaming thereto. A microphone/speaker driver 47 allows speech to be converted to electrical signals which are then encoded by an audio codec 48 for producing an audio stream in a known manner. A video codec 58 allows received video image to be decoded for display by a display driver 59 coupled thereto.

Figure 6:
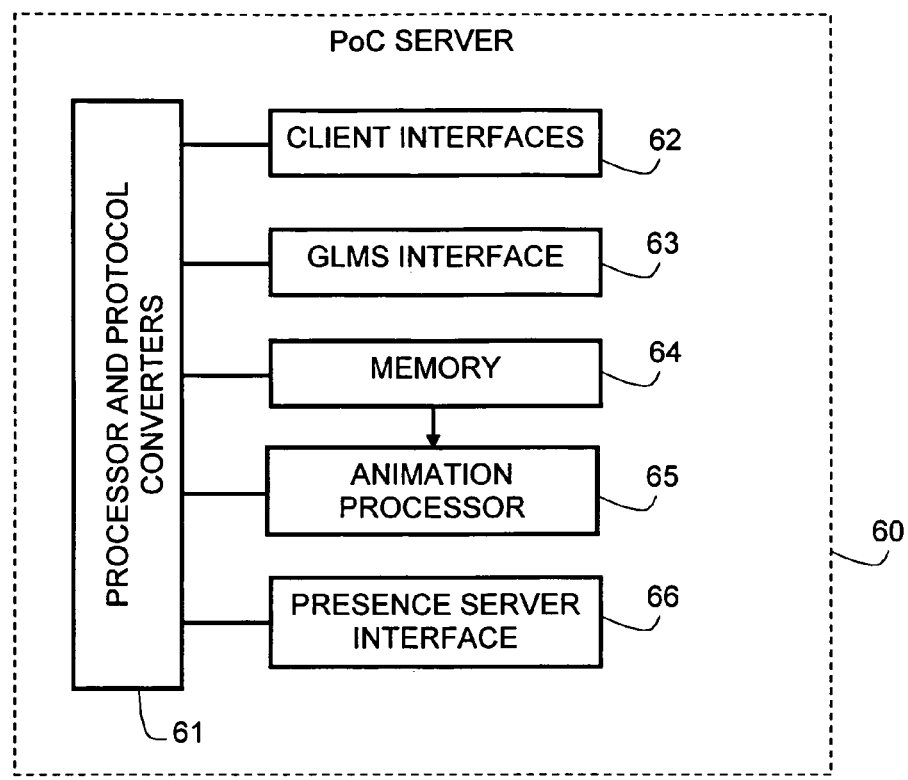
FIG. 6 is a block diagram showing the functionality of a PoC server adapted to convey real time streaming audio-video between a source telephone and a receiving device in accordance with another exemplary, non-limiting embodiment.

FIG. 6 is a block diagram showing the functionality of a PoC server 60 adapted to convey real time streaming audio-video between a source telephone and a receiving device according to an exemplary, non-limiting embodiment of the present invention. The PoC server 60 has a processor and protocol converters shown generally as 61. Furthermore, the PoC server 60 has client interfaces 62 that are coupled to the processor 61 and serve as first and second interfaces for coupling to respective first and second telephone devices. Both of the telephone devices have a display and at least one has an integral camera as explained above. A GLMS interface 63 allows groups to be defined so that an incoming call directed to one member of the group may be automatically sent to the other members of the group. Accordingly, multicast transmissions may be conveyed to several parties simultaneously. A memory 64 stores data such as a photographic image of registered senders.

The PoC server 60 further has an animation processor 65 that is adapted to create an avatar based on the photographic image of the sender in the event that no video streaming data was received therefrom. This allows an animated avatar representative of the sender to be created and conveyed to the receiving device for display thereby. A presence server interface 66 allows connection of the optional presence server 37 as described above with reference to FIG. 3.

Figure 7:
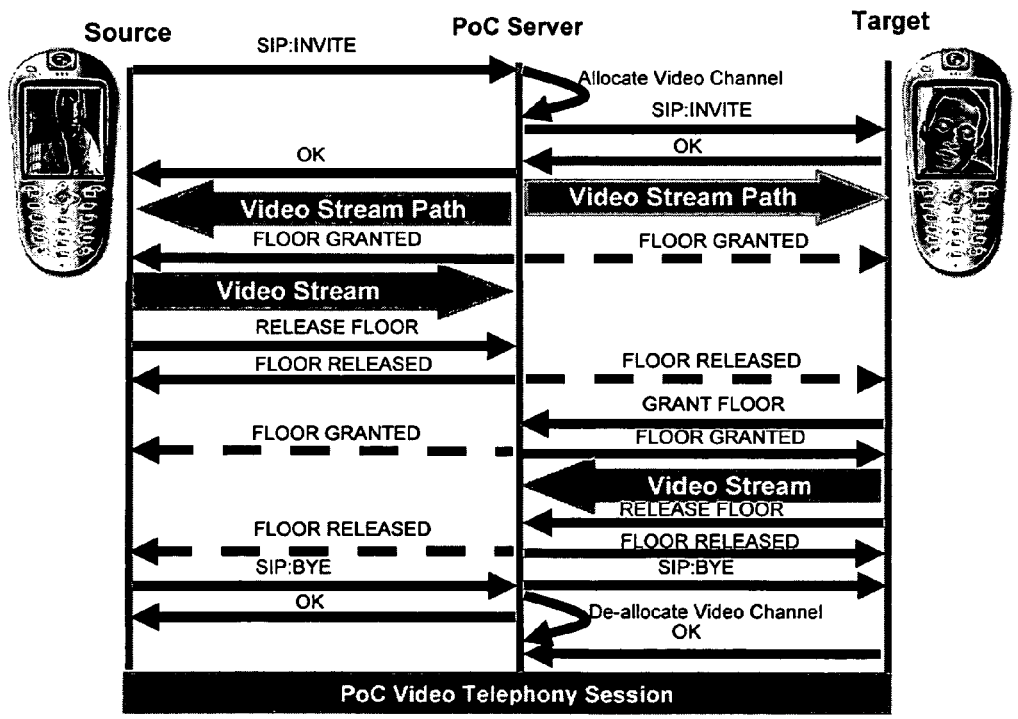
FIG. 7 is a schematic 'Call Flow' diagram showing signaling between two telephones one of which conveys real time streaming audio-video to the other in accordance with another exemplary, non-limiting embodiment.

FIG. 7 is a schematic 'Call Flow' diagram showing signaling between two telephones one of which conveys real time streaming audio-video to the other in accordance with an illustrative, non-limiting embodiment. By way of example, a call flow will be described with regard to the use of the Session Initiation Protocol (SIP) (the current edge of VoIP Telephony) but one of ordinary skill in the art would readily recognize that any other suitable protocol may be employed such as SS7 (the current PSTN standard) as well as other suitable protocols are clearly contemplated. In addition, one of ordinary skill in the art will understand that in the following description reference to VoIP is intended also to encompass 3GPP IMS and 3GPP IMS is also within the scope of the invention. Thus, FIG. 7 shows how the exemplary system operates under VoIP using the same architecture as in the PSTN; thus, the exemplary system demonstrates that the invention is applicable to both PSTN and VoIP or a combination of the two, and makes it apparent that the architecture shown in FIG. 2 can be used with any combination of telephone networks.

In FIG. 7 each message is a SIP message described in detail in the IETF RFC-3261 specification which is incorporated herein by reference. Thus, the calling party (denoted as "source") at the source telephone 11 calls the called party (denoted as "target") at the target telephone 12. The source telephone may be a VoIP phone referenced with a reference numeral 25 in FIG. 2, typically being a SIP application running on a PC that is used to call the target telephone 12 over the Internet. The target telephone 12 is also SIP-enabled. The source telephone 11 calls the target telephone 12 using the latter's SIP identity, a type of Uniform Resource Identifier (URI) called a SIP URI, having a form similar to an e-mail address.

SIP is based on a series of HTTP-like request/response transactions each consisting of a request that is directed to a server for invoking a particular method or function thereon and at least one response that is directed from the server to the initiating device. Thus, in FIG. 7, the source telephone sends the INVITE (SIP: INVI) to the PoC server that serves as the target telephone's domain and which also operates under SIP. An exemplary PoC server was described in detail with reference to FIG. 6. For simplicity, FIG. 7 omits the intermediate servers and shows only the principal actors in the connection: namely, the source and target telephones and the PoC server, but one of ordinary skill in the art will understand that the actual connections are effected via one or more intermediate switches and this is clearly within the scope of the invention. In the case that one of the two telephones is VoIP, the intermediate switch will be a soft proxy, while in PSTN, the intermediate switch is a Switch.

The source initiates a floor request by pressing the PoC actuator thus sending an INVITE signal (SIP:INVI) to the target telephone via the PoC server. When the PoC server receives the INVITE from the source telephone, the server allocates a video channel (Allocate) and sends the INVITE (SIP:INVI) to the target telephone, which responds with an OK signal denoted as 200 in the SIP protocol, which is sent back to the source telephone via the PoC server. If the PoC server responds with a different status, the caller will either continue trying while receiving a ringing response or will cancel the call upon receiving a busy response. The ringing signal uses a custom SIP code that causes a special ring signal to be evoked so as to indicate to the called party that the incoming call is of the push-to-talk variety.

The INVITE signal includes a station description protocol (SDP) which indicates to the PoC server that the source telephone is equipped to send a video stream, and therefore requires that a video stream path be established between the source and the PoC server. The SDP is part of the SIP protocol, which includes the facility to define video streaming but has not been previously exploited by the PoC standard to define video streaming, since video streaming has not been previously supported by the PoC standard.

When the target (the called party) picks up the incoming call, a SIP signal OK is sent to the source telephone via the PoC server thus establishing a video streaming path between the source and the target telephones via the PoC server. The video streaming path is directional and is shown as being directed from the PoC server to the source telephone. Substantially, at the same time a video streaming path is established from the PoC server to the target telephone. The establishment of video streaming paths from the PoC server to both the source and target telephones causes the floor request to be granted and notification of the floor grant (FLOOR) is sent by the PoC server to the source telephone and to all other participants, the targets, so as to inform them that the floor has been taken and who has taken it.

The source telephone can now send a video stream to the PoC server. Since this video stream is in the opposite direction to that previously defined by the video streaming path established by the PoC server to the source telephone, a video streaming path (Video Stream) in the opposite direction is established, i.e., from the source telephone to the PoC server. Since a video streaming path has already been established from the PoC server to the target telephone, the video data is conveyed along this path to the target telephone. The source telephone then releases pressure from the PoC actuator, thereby releasing the floor (RELEASE FLOOR), this release is communicated by the PoC server to all other participants, i.e., the target telephone. In other words, the PoC server notifies the target telephone of the floor release (FLOOR RELEASED).

When the floor is released, any authorized participant may request to take the floor. For example, as illustrated in FIG. 7, the target telephone now presses the PoC actuator on his device and the same mechanism as described above operates in the reverse direction until the source telephone terminates the session, thereby sending the SIP:BYE signal to the target telephone via the PoC server, in response to which the PoC server de-allocates the video channel and terminates the session. Any participant in a PoC session may leave the session at any time. When a participant leaves the PoC session, a leave message (SIP:BYE) will be sent to the PoC server. The PoC server will approve the leave message from a participant by sending an OK signal. A session becomes invalid when it has one or no participants. At this time, the server will close the session and will send a SIP:BYE message to the remaining active participant. Then, the PoC server de-allocates the video channel. The PoC server also receives an OK signal from the remaining active participant.

One of ordinary skill in the art will understand that the client and the PoC server may be suitably programmed computers. In this context, it is to be noted that the borderline between portable telephones and computers is becoming increasingly vague since both may be equipped with a processor, memory and internal program as well as interfaces to peripheral equipment, such as a video camera and display, which may be built-in. Therefore, for the purpose of interpreting the attached claims no distinction is implied and it is to be understood that reference to a "portable telephone" and to "telephone" may equally apply to a computer having a suitable communications interface. Likewise, the invention contemplates a computer program being readable by a computer for executing the method of the invention. The invention further contemplates a machine-readable memory tangibly embodying a program of instructions executable by the machine for executing the method of the invention.

Likewise, although the embodiments have been described with particular reference to PoC enabled devices, it is to be understood that this is by way of example only. There are obvious commercial advantages in exploiting the PoC standard because it is already being used extensively in cellular telephony to convey audio push-to-talk. However, the principles of the invention are also applicable to other protocols for allowing real time video streaming data to be conveyed between two or more portable telephones or equivalent devices.

The above description of illustrative, non-limiting embodiments has been given by way of an example. The above and other features of the invention including various novel method steps and a system and a device of the various novel components have been particularly described with reference to the accompanying drawings and pointed out in the claims. It will be understood that the particular process and construction of parts embodying the invention is shown by way of an illustration only and not as a limitation of the invention. The principles and features of this invention may be employed in varied and numerous embodiments without departing from the scope of the invention as defined by the appended claims and equivalents thereof.

The invention claimed is:

1. A communications device comprising:
   a display;
   an integral camera;
   a memory for storing a buddy list of members possessing enhanced communications devices having video receive capability;
   a user interface coupled to the memory, the user interface allowing user selection of a member from the buddy list; and
   a user status interface to the memory and to the user interface, the user status interface operable for determining an availability status of the member selected by the user interface and operable for causing an indication of said status to be displayed on the display of the communications device,
   wherein the communications device is provided with a walkie-talkie mode, and supports half-duplex communications in the walkie-talkie mode for conveying real time streaming audio-video to at least one receiving device.

2. The communications device according to claim 1, wherein the communications device is a cellular telephone.

3. The communication device according to claim 1, wherein, when the communication device operates in the walkie-talkie mode, the communications device conveys streaming of video in real time to said at least one receiving device via a wireless network.

4. The communication device according to claim 1, wherein the communication device provides real time video streaming in the walkie-talkie mode in a wireless network.

5. The communication device according to claim 1, wherein the communications device is provided with a walkie-talkie-mode operable for conveying real time streaming audio-video simultaneously with capture of the audio-video to at least one receiving device.

6. The communications device according to claim 1, wherein the integral camera is configured to operate in walkie-talkie mode.

7. A server for use in a telephone communications system, said server comprising:
   a first interface adapted for coupling to a first communications device, the first communications device comprises a display and an integral camera and is provided with a walkie-talkie mode for conveying real time streaming video to the server, and
   a second interface adapted to convey said real time streaming video and audio to a second communications device coupled to the second interface, the second communications device comprises a display adapted to display the conveyed real time streaming video, and
   a third interface coupled to a presence server, for receiving data therefrom indicative of an availability status of a selected party and for conveying representative data to the first communications device.

8. The server according to claim 7, further comprising a fourth interface coupled to a group level management server, for receiving therefrom group level management data indicative of predefined groups of members, wherein the server is responsive to said group level management data for conveying real time streaming video to a respective second communications device of each member in the selected group.

9. The server according to claim 7, further comprising:
   an animation processor adapted to receive an audio stream from a communications device having a walkie-talkie mode for conveying an audio stream only to the server, said animation processor being responsive to the audio stream for producing an avatar;
   wherein the second interface coupled to the animation processor for allowing said avatar to be conveyed as real time streaming video to a receiving device having video streaming receiving capability.

10. The server according to claim 9, wherein the animation processor is adapted to access a photograph of a sender of an audio-only message for producing an avatar representative of the sender.

11. A real-time audio-video communications system comprising:
   a source client;
   a target client;
   a protocol converter coupled to the source client and to the target client via an access network; and
   a server coupled to the protocol converter and via the access network to the source client and to the target client,
   wherein the source client and the target client are provided with a display and a walkie-talkie actuator,
   wherein at least one of the source client and the target client is provided with an integral camera,
   wherein the server is adapted to convey real time streaming audio-video to the source client and the target client,
   wherein the server is adapted to receive real time streaming video from the at least one of the source client and the target client, wherein a client providing the real time streaming video includes an integral camera and provides the real time streaming video in a walkie-talkie mode, and
   wherein the source client, the target client, and the server support half-duplex communication in the walkie-talkie mode.

12. The real-time audio-video system according to claim 11, further comprising:
   respective AB presence units in the source client and the target client being coupled to a presence server for maintaining status information relating to the source client and to the target client; and
   a Group Management Server coupled to the AB presence units via the access network,
   wherein said presence server is coupled to the protocol converter and to the server and the Group Management Server for communicating with the respective AB presence units in the source client and the target client.

13. A server for use in a telephone communications system, the server comprising:
- a first interface means for coupling to a first communications device, the first communications device comprises a display and an integral camera and is provided with a walkie-talkie mode for conveying real time streaming video to the server, and
- a second interface means for conveying said real time streaming video and audio to a second communications device coupled to the second interface, the second communications device comprises a display adapted to display the conveyed real time streaming video and audio,
- wherein the server and the first communications device support half-duplex communication in the walkie-talkie mode.

14. A method for conveying real time streaming audio-video in a communications network, the method comprising:
- converting speech and video image of a source communications device using audio codec and video codec into the real time streaming audio-video;
- selecting by a source communications device at least one target communications device; and
- transmitting via a server the real time streaming audio-video to the at least one selected target communications device, wherein:
- the source and target communications devices support a walkie-talkie mode,
- the real time streaming audio-video is transmitted in the walkie-talkie mode, and
- the source and target communications devices support half-duplex communication in the walkie-talkie mode.

15. The communication device according to claim 14, wherein the communications device is a wireless telephone.

* * * * *